(12) United States Patent
Subramanian (10) Patent No.: US 10,798,755 B2
(45) Date of Patent: Oct. 6, 2020

(54) MILLIMETER WAVE (MMWAVE) RADIO RESOURCE ALLOCATION SCHEME FOR VEHICLE-TO-INFRASTRUCTURE (V2I) COMMUNICATIONS

(71) Applicant: Cisco Technology, Inc., San Jose, CA (US)

(72) Inventor: Ramanathan Subramanian, Milpitas, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/265,533

(22) Filed: Feb. 1, 2019

(65) Prior Publication Data

US 2020/0128591 A1    Apr. 23, 2020

Related U.S. Application Data

(60) Provisional application No. 62/747,189, filed on Oct. 18, 2018.

(51) Int. Cl.
| | | |
|---|---|---|
| *H04W 76/10* | (2018.01) | |
| *H04W 72/04* | (2009.01) | |
| *H04W 4/44* | (2018.01) | |
| *H04W 56/00* | (2009.01) | |
| *H04L 5/00* | (2006.01) | |

(52) U.S. Cl.
CPC .......... *H04W 76/10* (2018.02); *H04L 5/0007* (2013.01); *H04W 4/44* (2018.02); *H04W 56/001* (2013.01); *H04W 72/044* (2013.01)

(58) Field of Classification Search
CPC ..... H04W 76/10; H04W 4/44; H04W 56/001; H04W 72/044; H04L 5/0007
USPC .......................... 370/310, 328, 329
See application file for complete search history.

(56) References Cited

U.S. PATENT DOCUMENTS

| 9,788,282 B2 | 10/2017 | Neves | |
|---|---|---|---|
| 2011/0038345 A1* | 2/2011 | Liu | H04W 72/0413 370/330 |

(Continued)

OTHER PUBLICATIONS

Shokri-Ghadikolaei, et al., "Design Aspects of Short Range Millimeter Wave Networks: A MAC Layer Perspective", IEEE Network, vol. 30, Issue 3, May-Jun. 2016, pp. 88-96.

(Continued)

*Primary Examiner* — Obaidul Huq
(74) *Attorney, Agent, or Firm* — Behmke Innovation Group LLC; James J. Wong; James M. Behmke (57) ABSTRACT

In one embodiment, a millimeter wave (mmWave) radio resource allocation scheme for vehicle-to-infrastructure (V2I) communications is disclosed, which may illustratively comprise receiving, by a base station, a connection request of a plurality of connection requests from a mobile station of a plurality of mobile stations; determining, by the base station, a resource block allocation scheme that is formulated as a two dimensional rectangular bin for the plurality of mobile stations; allocating, by the base station, one or more resource sub-blocks of the resource block allocation scheme to the mobile station using at least one packing parameter; and controlling, by the base station, the mobile station to communicate with the base station using the one or more resource sub-blocks.

20 Claims, 8 Drawing Sheets

(56) References Cited

U.S. PATENT DOCUMENTS

| | | | |
|---|---|---|---|
| 2014/0269604 A1* | 9/2014 | Kamiya | H04L 5/0066 370/330 |
| 2016/0241314 A1 | 8/2016 | Ferrante | |
| 2017/0150419 A1 | 5/2017 | Li | |
| 2017/0188391 A1 | 6/2017 | Rajagopal | |
| 2017/0272295 A1* | 9/2017 | Lee | H04L 5/00 |
| 2017/0331670 A1 | 11/2017 | Parkvall | |
| 2019/0174497 A1* | 6/2019 | Wang | H04L 5/0094 |
| 2019/0215378 A1 | 7/2019 | Munishwar | |

OTHER PUBLICATIONS

Maltsev, et al., "Highly Directional Steerable Antennas: High-Gain Antennas Supporting User Mobility or Beam Switching for Reconfigurable Backhauling", IEEE Vehicular Technology Magazine, vol. 11, Issue 1, Mar. 2016, pp. 32-39.

Heath, et al., "An Overview of Signal Processing Techniques for Millimeter Wave MIMO Systems" IEEE Journal of Selected Topics in Signal Processing, vol. 10, Issue 3, Apr. 2016, pp. 32-39.

Mehaseb, et al., "Classification of LTE Uplink Scheduling Techniques: An M2M Perspective", IEEE Communications Surveys & Tutorials, vol. 18, Issue 2, Second quarter 2016, pp. 1310-1335.

Lodi, et al., "Efficient Two-Dimensional Packing Algorithms for Mobile WiMAX", Management Science, vol. 57, No. 12, Dec. 2011, 33 pages.

Andrews, et al., "Modeling and Analyzing Millimeter Wave Cellular Systems", IEEE Transactions on Communications, vol. 65, Issue 1, Jan. 2017, pp. 403-430.

Barati, et al., "Directional Cell Discovery in Millimeter Wave Cellular Networks", IEEE Transactions on Wireless Communications, vol. 14, Issue 12, Dec. 2015, pp. 6664-6678.

Basholli, et al., "Resource Request Mapping Techniques for OFDMA Networks", Resource Management in Mobile Computing Environments. Modeling and Optimization in Science and Technologies, vol. 3., Chapter 7, 2014, Springer, Cham.

* cited by examiner

MILLIMETER WAVE (MMWAVE) RADIO RESOURCE ALLOCATION SCHEME FOR VEHICLE-TO-INFRASTRUCTURE (V2I) COMMUNICATIONS

RELATED APPLICATION

This application claims priority to U.S. Provisional Patent Application No. 62/747,189, filed on Oct. 18, 2018, entitled "MILLIMETER WAVE (mmWave) RADIO RESOURCE ALLOCATION SCHEME FOR VEHICLE-TO-INFRASTRUCTURE (V2I) COMMUNICATIONS" by Subramanian, the contents of which are incorporated by reference herein.

TECHNICAL FIELD

The present disclosure relates generally to computer networks, and, more particularly, to a millimeter wave (mmWave) radio resource allocation scheme for vehicle-to-infrastructure (V2I) communications.

BACKGROUND

Many vehicles, such as automobiles, are becoming increasingly sophisticated in terms of on-board sensors, sensor data processing, and overall vehicle capabilities. For example, autonomous vehicles, also sometimes referred to as self-driving cars, may leverage complex sensors and data processing techniques, such as to route the vehicles to their destinations and avoid roadway hazards. Trials of autonomous vehicles are now being conducted in many cities.

With the increasing computerization of vehicles also comes an increasing push to connect vehicles to other systems (V2X). For example, vehicle-to-vehicle (V2V) communications allows nearby vehicles to share data between one another, such as detected hazards, coordinating platoons of autonomous vehicles that travel together in unison, and the like. Similarly, vehicle-to-infrastructure (V2I) communications allow vehicles to communicate with existing computer networks, such as the Internet. By connecting vehicles to the existing infrastructure, it becomes possible to manage and monitor large numbers of vehicles at once. Current communications standards (e.g., dedicated short-range communications (DSRC) standards and Long Term Evolution-Advanced (LTE-A)) fall short of meeting the communication constraints posed by the emerging applications, such as fully autonomous vehicles, live streaming multiple high resolution (e.g., 4K) videos, or other high bandwidth and/or low latency applications.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a millimeter wave (mmWave) radio resource allocation scheme for vehicle-to-infrastructure (V2I) communications is disclosed. Illustratively, the techniques herein may comprise receiving, by a base station, a connection request of a plurality of connection requests from a mobile station of a plurality of mobile stations; determining, by the base station, a resource block allocation scheme that is formulated as a two dimensional rectangular bin for the plurality of mobile stations; allocating, by the base station, one or more resource sub-blocks of the resource block allocation scheme to the mobile station using at least one packing parameter; and controlling, by the base station, the mobile station to communicate with the base station using the one or more resource sub-blocks.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh network, such as wireless or PLC networks, etc., and are often on what is referred to as Low-Power and Lossy Networks (LLNs), which are a class of networks in which both the routers and their interconnects are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Figure 1A:
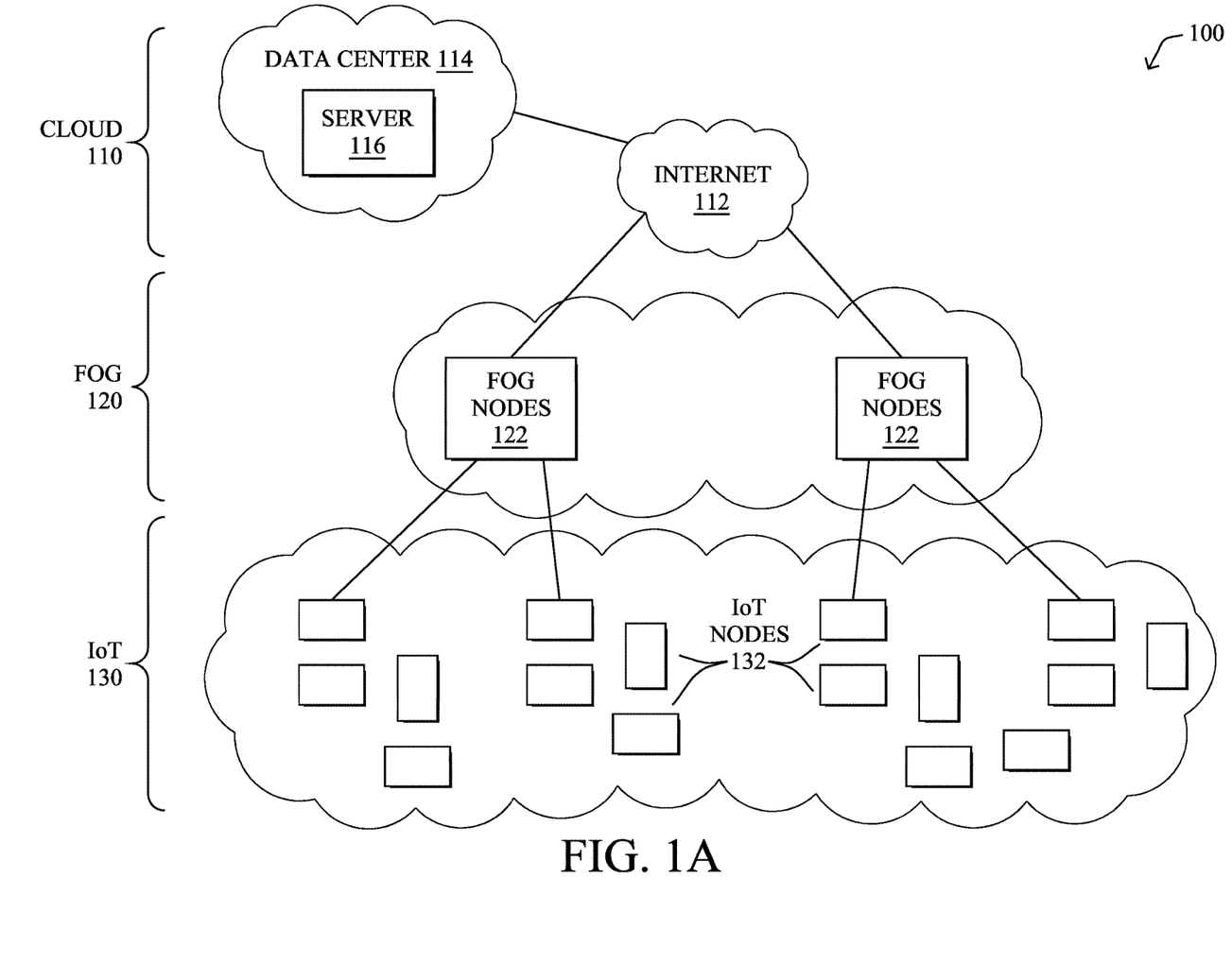
FIGS. 1A-1B illustrate an example communication network.

FIG. 1A is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, Power Line Communications (PLC) protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
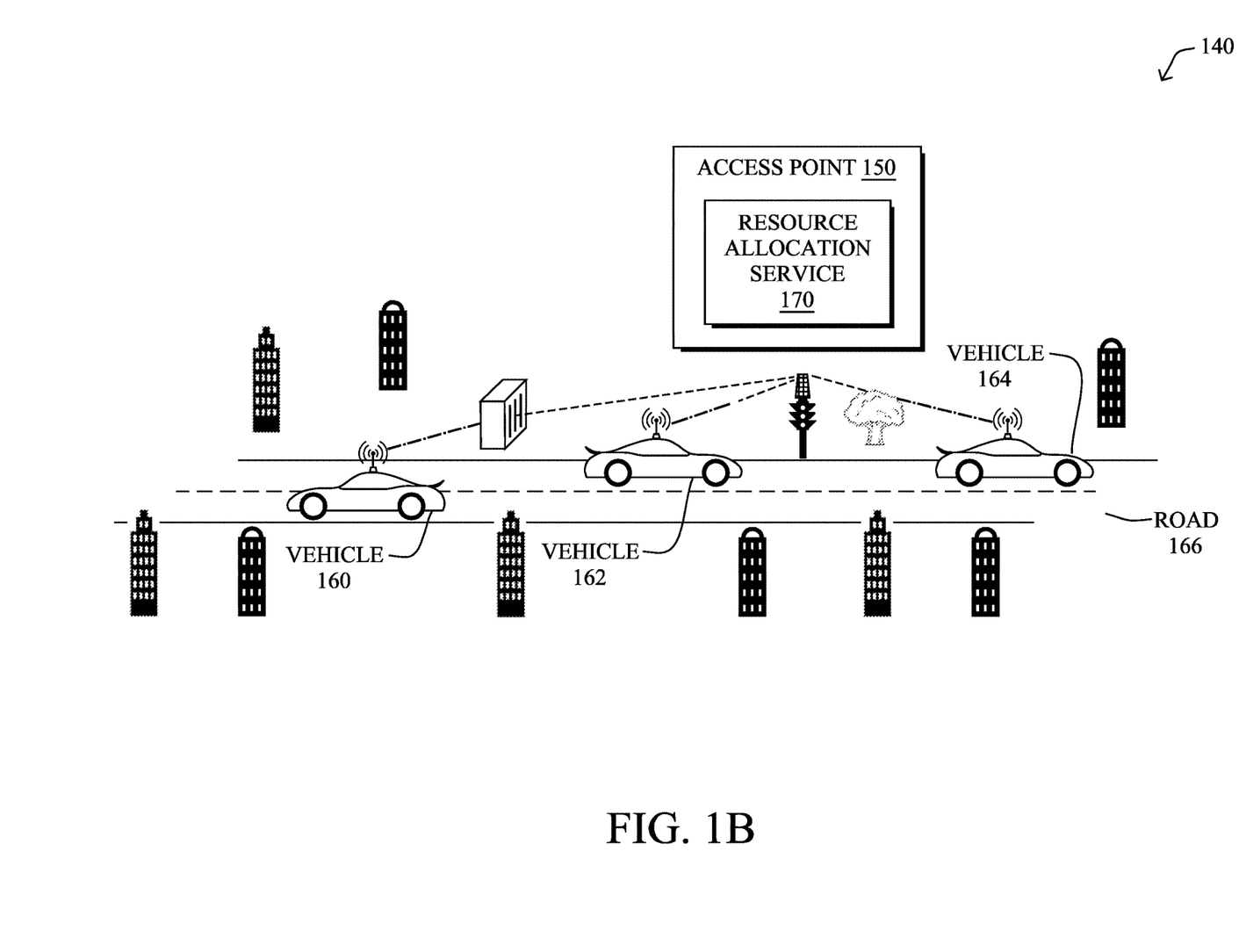

As a specific illustration of a certain type of IoT network, FIG. 1B illustrates an example connected vehicle system 140, according to various embodiments. In particular, connected vehicle system 140 may include any or all of the following components: a plurality of vehicles 160-164 on a road 166, and an access point 150 configured to execute and/or perform a resource allocation service 170. During operation, connected vehicle system 140 may be operable to interface vehicle 160 with a backend computer network, such as the Internet, to which resource allocation service 170 belongs.

In some embodiments, connected vehicle system 140 may be a specific implementation of communication network 100. For example, access point 150 may be a fog node 122 at fog computing layer 120, while the plurality of vehicles 160-164 may be viewed as an IoT node 132 at IoT layer 130. Thus, vehicle 160 may communicate directly with access point 150, and/or via other IoT nodes 132 (e.g., other vehicles, roadside sensors, etc.), and access point 150 may provide some degree of processing or storage over the communicated data.

Generally, as shown, a vehicle 160 of the plurality of vehicles 160-164 may be an automobile, motorcycle, truck, aircraft, autonomous drone, or any other type of vehicle configured to communicate via connected vehicle system 140. In some embodiments, a vehicle 160 of the plurality of vehicles 160-164 may be a fully autonomous vehicle or a semi-autonomous vehicle that allows a driver to exert control over vehicle 160, as desired.

The access point 150 may be configured to allocate communication resources to the plurality of vehicles 160-164 with resource allocation service 170 via a WAN, such as the Internet 112 or another WAN. For example, access point 150 may communicate with resource allocation service 170 by leveraging a hardwired network connection, cellular or other wireless connection, satellite connection, or the like. Communications between vehicle 160 and access point 150 may generally be wireless and use any form of known wireless communication (e.g., Wi-Fi, cellular, light-based, etc.). More specifically, access point 150 may be part of a radio access network that provides wireless connectivity between a backbone network and vehicle 160. Further, the access point 150 may be (or be a part of) a road side unit (RSU) that is placed along the road 166, where the RSU is configured to act as an intermediary device that can re-transmit communications (e.g., uplink, downlink, etc.) between the vehicle 160 and another vehicle.

In one embodiment, the access point 150 may illustratively communicate with the plurality of vehicles 160-164 in accordance with IEEE 802.11 communication standards. In particular, the access point 150 and the plurality of vehicles 160-164 may include one or more communications antennas. The one or more communications antennas may be any suitable type of antennas corresponding to, for example, the IEEE 802.11 communication standards. Examples of suitable communications antennas include Wi-Fi antennas, IEEE 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component(s) to transmit and/or receive signals, such as communications signals among the access point 150 and the plurality of vehicles 160-164.

The access point 150 and the plurality of vehicles 160-164 may be configured to perform directional transmission and/ or directional reception in conjunction with wirelessly communicating in a wireless network. Such directional transmission and/or reception can be performed using a set of multiple antenna arrays (e.g., DMG antenna arrays or the like). Each of the multiple antenna arrays may be used for transmission and/or reception in a particular respective direction or range of directions. The access point 150 and the plurality of vehicles 160-164 be configured to perform any given directional transmission a) towards one or more defined transmit sectors and/or b) from one or more defined receive sectors. Additionally, MIMO beamforming in the connected vehicle system 140 may be accomplished using radio frequency (RF) beamforming and/or digital beamforming. In particular, the access point 150 and the plurality of vehicles 160-164 may be configured to use all or a subset of its one or more communications antennas to perform MIMO beamforming.

The access point 150 and the plurality of vehicles 160-164 may include any suitable radio component(s) for transmitting and/or receiving RF signals in a bandwidth and/or channel corresponding to the communications protocols utilized by the access point 150 and the plurality of vehicles 160-164. The radio component(s) may include hardware and/or software to modulate and/or demodulate communications signals according to pre-established transmission protocols. The radio component(s) may further have hardware and/or software instructions to communicate via one or more IEEE 802.11 communication standards. For example, the radio component(s), in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), 60 GHz channels (e.g. 802.11ad, 802.11ay), or mmWave channels (e.g., 30-300 GHz). In another example, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component(s) may include any known receiver and baseband suitable for communicating via the communications protocols. Further, the radio component(s) may include a low noise amplifier (LNA), additional signal amplifiers, an analog-to-digital (A/D) converter, one or more buffers, and digital baseband.

As would be appreciated, a vehicle 160 of the plurality of vehicle 160-164 may comprise its own local network, to allow the various components of vehicle 160 to communicate with one another. For example, the vehicle 160 may comprise a controller area network (CAN) bus, IP network, or the like, to allow the various systems of vehicle 160 to communicate with one another. Such system may include, but are not limited to, an engine control unit (ECU), a battery management system (BMS) that manages the local battery of vehicle 160, if the vehicle 160 is an electric vehicle, processors controlling vehicle body functions, and the like. A local gateway of the vehicle 160 may provide communicative connectivity between the local network of the vehicle 160 and other devices.

Figure 2:
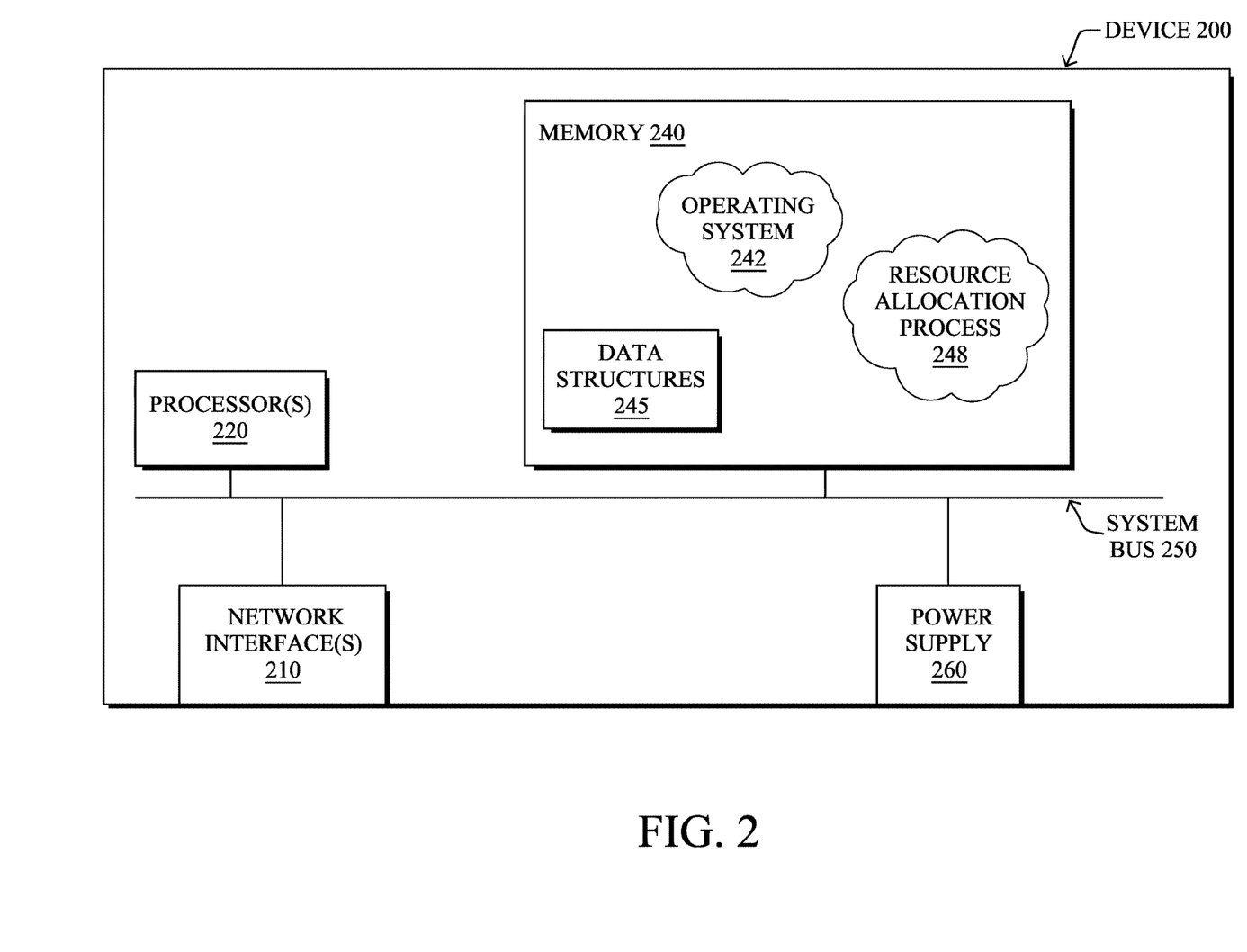
FIG. 2 illustrates an example network device/node.

FIG. 2 is a schematic block diagram of an example computing device/node 200 (e.g., an apparatus) that may be used with one or more embodiments described herein, for example, as any of the devices shown in FIGS. 1A-1B above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Further, the network interface(s) 210 may include the antennas and/or radio components described herein above for wireless communications (e.g., according to one or more 802.11 communication standards).

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor 220, functionally organizes the device by, among other things, invoking operations in support of software processes and/or services executing on the device. These software processes and/or services may comprise an illustrative resource allocation process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Radio Resource Allocation Scheme for V2I Communications——

As noted above, current communications standards fall short of meeting communication constraints posed by the emerging applications for vehicle-to-infrastructure (V2I) communications, such as fully autonomous vehicles, live streaming multiple high resolution (e.g., 4K) videos, or other high bandwidth and/or low latency applications. For example, DSRC standards (e.g., IEEE 802.11p), despite providing a physical layer (PHY) layer with robust to Doppler spread estimation and low-latency, suffers from: 1) high collision probabilities under medium to high loads due to its contention based random access and 2) a maximum data rate that does not exceed six megabits per second (Mbps). As another example, Long Term Evolution-Advanced (LTE-A) supports a maximum data that rate is limited to 100 Mbps with end-to-end latencies that exceed 100 milliseconds (ms).

Commercialized mmWave systems show promise in ensuring gigabit-per-second throughput and latencies smaller than 10 ms. In a mmWave system, a base station (e.g., access point) and mobile stations may employ highly directional beams realized using the large antenna arrays to provide sufficient received signal power. A mmWave channel is identified to possess a sparse nature due to the use of large bandwidths and multiple closely spaced antennas. This spatial sparsity of the mmWave channel property, along with the out-of-band information from on-board automotive sensors and communication signals at sub-6 GHz and GPS signals, may be used for fast and accurate mmWave V2I beam alignment and transmission in high mobility scenarios.

In a more detailed example of how commercialized mmWave systems may be used for V2I communications, autonomous (and semi-autonomous) driving vehicles have and will demand increasingly high volume data transmission of, for example, three-dimensional high definition (3D HD) maps to plan and navigate routes, frequent software upgrades, etc. Moreover, such vehicles have and will include numerous on-board sensors (e.g., cameras) that generate voluminous sensory data that may be pre-processed and/or pushed to a cloud infrastructure. mmWave mobile communication can in principle enable downloading/uploading this high volume data in under, say, a minute or two, as there is contiguous GHz wide mmWave bands. By implementing the mmWave mobile communications, the autonomous (and semi-autonomous) driving vehicles may aggregate all the sensory data traffic and then push all that data to the cloud infrastructure by way of V2I communications.

The techniques herein enable resolution of concurrent access requests made by multiple vehicles operating in mmWave bands and, further, enable efficient allocation and service of radio resources for each vehicle of the multiple vehicles. In particular, the techniques herein provide an efficient multi-user association scheme and a time-frequency resource allocation scheme designed specifically for use in mmWave spectra. The multi-user association scheme addresses the need for beam alignment in mmWave channel communications (e.g., as compared to microwave communications) and avoids wasteful delay(s) caused by testing of beam combinations between a base station (e.g., access point) and mobile stations (e.g., vehicles). For the multi-user association scheme, beams of a base station (e.g., an access point) can be robustly aligned and quickly attain connectivity with mobiles stations (e.g., vehicles) prior to communication. In particular, the base station may periodically transmit synchronization signals, while the mobile stations scan for the presence of these signals to detect the base station, to learn a timing and direction of arrivals.

The time-frequency resource allocation scheme allocates time-frequency resources of the base station to associated mobile stations based on a packing objective. Every mobile station may be assigned a portion of time and an independent set of consecutive frequency subcarriers in a mmWave spectrum serviced by the base station, thereby allowing for heavy multiplexing of mobile stations. Each time-frequency resource block associated with a mobile station may represented by a smaller rectangle, whose edges are determined by a mobile station's data needs and a duration the mobile station will continue to be in line-of-sight (LOS) or non-line of sight (NLOS) with the base station (from the time it sent its request). The time-frequency resource allocation scheme may additionally address time-selective fading (introduced by high Doppler, arising from mobility of a mobile station, in the mmWave spectrum) by accounting for variable coherence time and coherence bandwidth.

Specifically, according to one or more embodiments of the disclosure as described in detail below, a mmWave radio resource allocation scheme forV2I communications is disclosed, which may include receiving, by a base station, a connection request of a plurality of connection requests from a mobile station of a plurality of mobile stations; determining, by the base station, a resource block allocation scheme that is formulated as a two dimensional rectangular bin for the plurality of mobile stations; allocating, by the base station, one or more resource sub-blocks of the resource block allocation scheme to the mobile station using at least one packing parameter; and controlling, by the base station, the mobile station to communicate with the base station using the one or more resource sub-blocks.

Illustratively, the techniques described herein may be performed by hardware, software, and/or firmware, such as in accordance with the resource allocation process 248, which may include computer executable instructions executed by the processor 220 (or independent processor of interfaces 210) to perform functions relating to the techniques described herein.

Figure 3A:
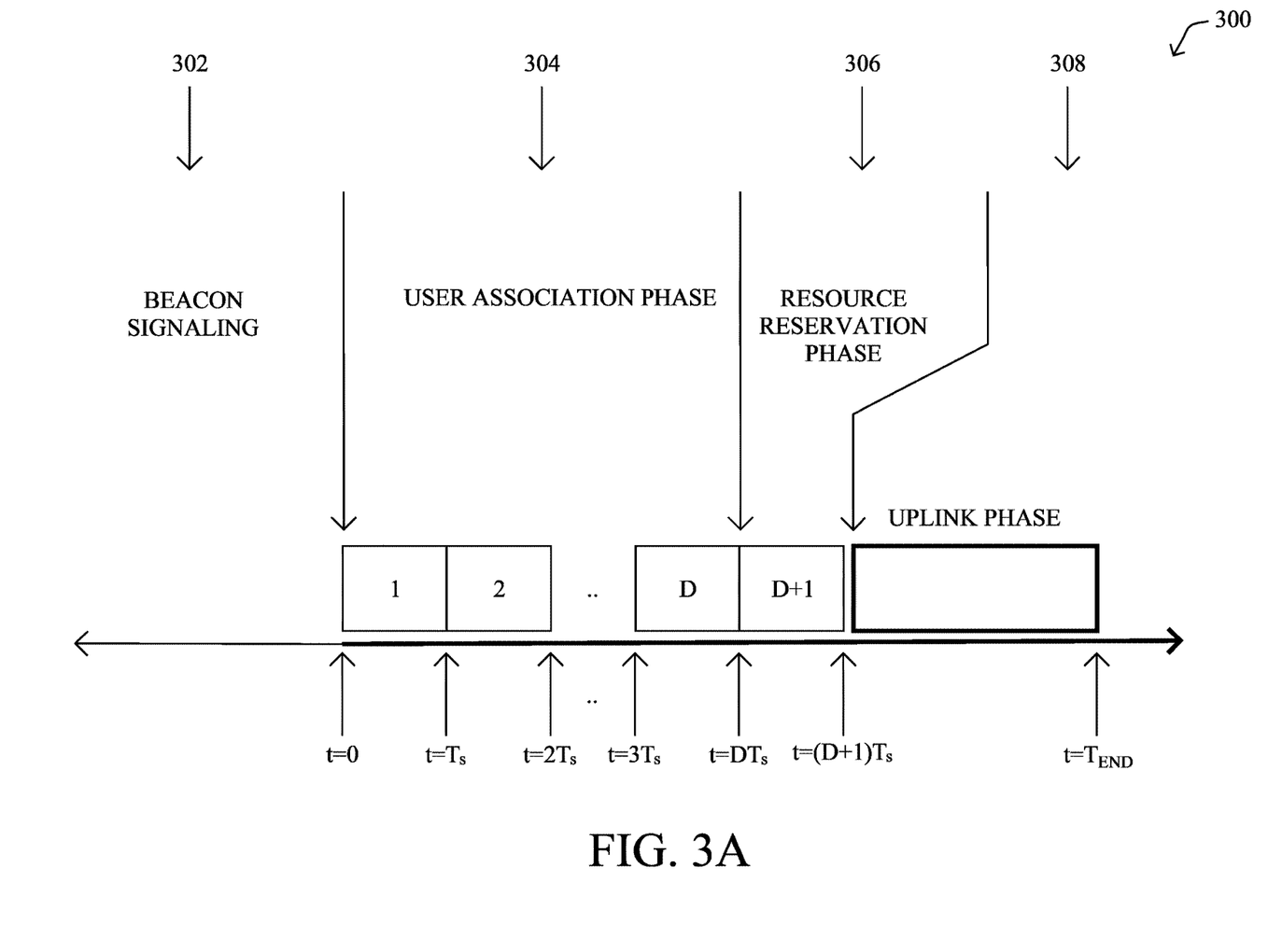
FIGS. 3A-3C illustrate an example millimeter wave (mmWave) resource allocation scheme for V2I communications.
Figure 3B:
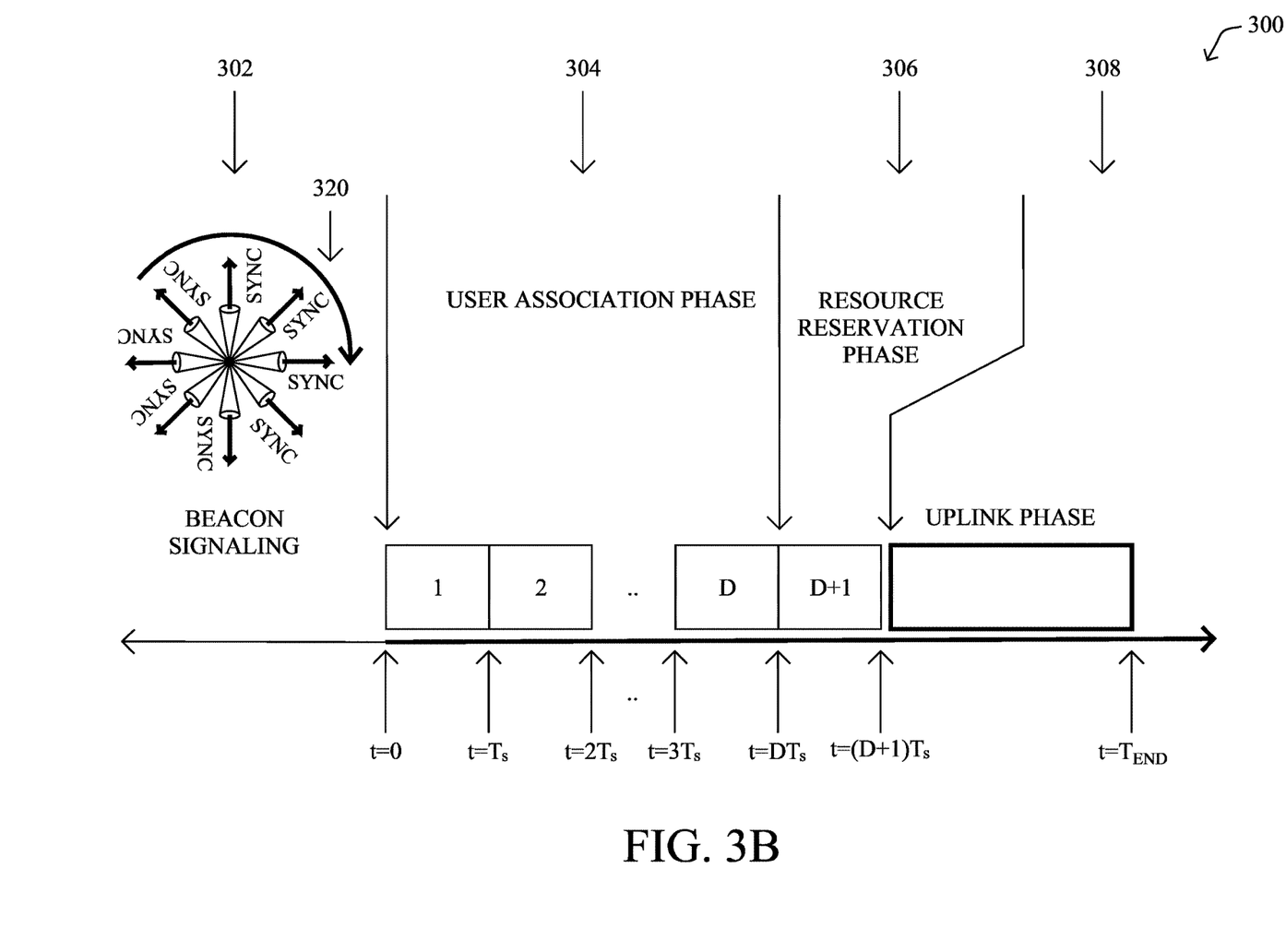
Figure 3C:
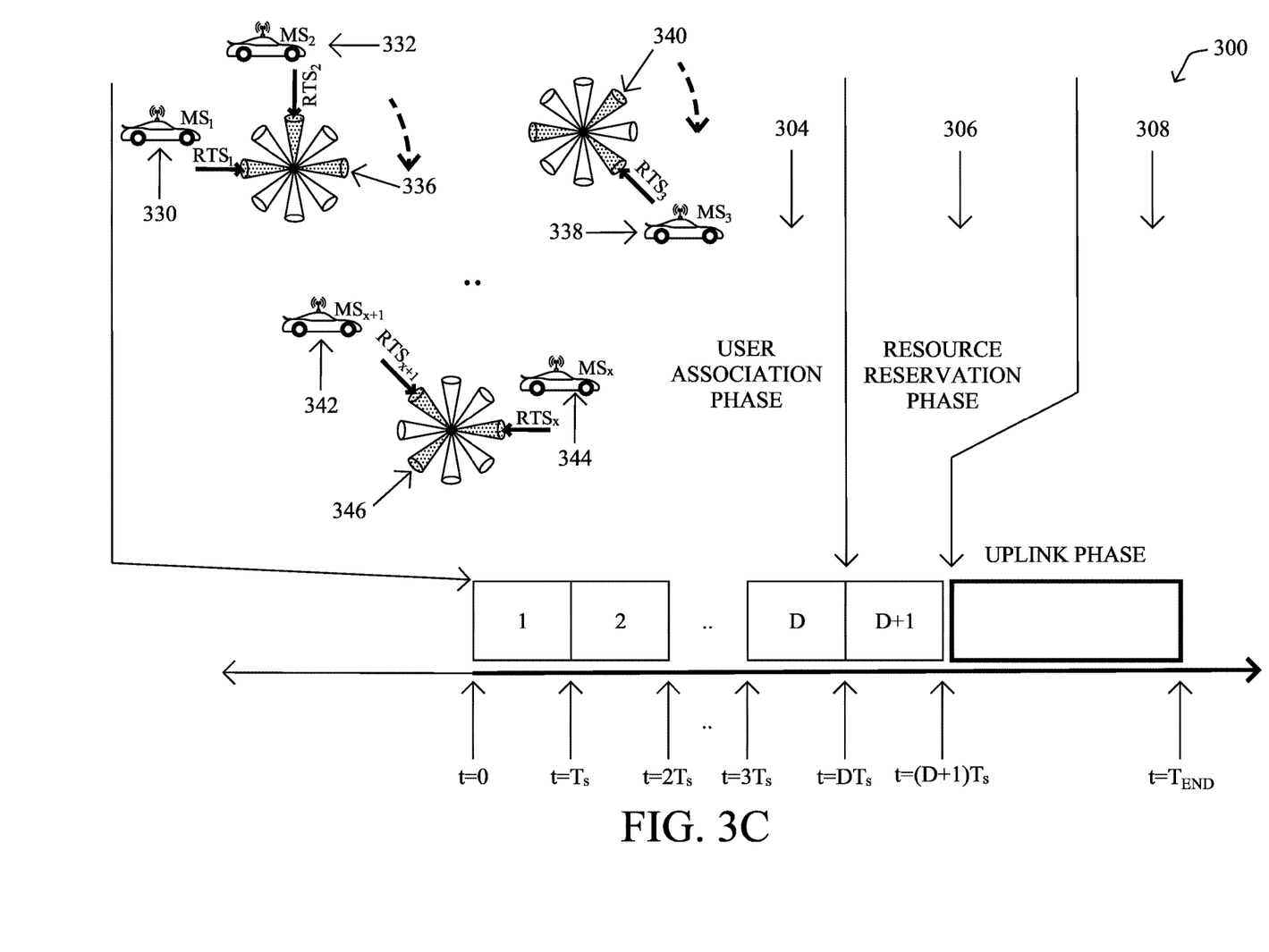

Operationally, consider the example of a mmWave resource allocation scheme for V2I communications in FIGS. 3A-3C. The resource mmWave resource allocation scheme 300 can be performed by the access point 150 shown in FIG. 1B, where the access point 150 is positioned at the side of the road installed atop, for example, a traffic light, a lamppost, or other road-side infrastructure, and manages V2I communications between the plurality of vehicles 160-164. As shown in FIG. 3A, the mmWave resource allocation scheme 300 includes: a beacon signaling phase 302, a user association phase 304, a resource reservation phase 306, and an uplink phase 308.

With reference to FIG. 3B, during the beacon signaling phase 302, a base station (e.g., the access point 150) may transmit a synchronization signal in all the beam directions support by the base station in a particular direction (e.g., clockwise or counter-clockwise). Mobile Stations may receive and decode the synchronization signal to synchronize with the base station. Specifically, the mobile stations may perform channel estimation to estimate a necessary beamforming direction (towards the base station). In order to keep beam steering complexity to a minimum, the base station may adopt a beam switching pattern 320. In particular, assuming the base station can transmit on N beams, the beam switching pattern 320 can occur in:

a random orientation of beam directions and switching of the N beams occurring in lock steps;

a fixed orientation of the beams with a random start time and switching of the N beams occurring in lock steps; or     a fixed orientation of the beam directions with a random switching of the N beams.

It is to be understood that to mitigate inter-beam interference (e.g., among the N beams) when using concurrent beams to establish connections between the base station and the mobile stations, beams may be selected that are maximally spaced apart.

Turning to FIG. 3C, during the user association phase 304, connections may be established between the base station and each of the mobile stations. In particular, after identifying the synchronization signal, a first mobile station 330 and a second mobile 332 station may each send connection requests (e.g., requests to send (RTS)) to the base station in a first beam sector 336 supported by the base station. A third mobile station 338 may send a connection request to the base station in a second beam sector 340 supported by the base station. Additionally, a fourth mobile station 342 and a fifth mobile station 344 may send a connection request to the base station in a third beam sector 346 support by the base station. Subsequent to receiving the connection request, the base station may decode the connection requests and associate with the mobile stations that sent the connection requests. The base station may stop switching of an orientation of a beam pattern after associating with a particular number of mobile stations (even if supported beam directions and/or sector are exhausted).

During the resource reservation phase 306, the base station may be configured to determine a resource block allocation scheme for the mobile stations that are associated with the base station. In particular, the resource block allocation scheme, as will be described in greater detail below, for the mobile stations may be formulated as a two-dimensional rectangular bin for the plurality of mobile stations where resource sub-blocks of the rectangular bin may be allocated to each mobile station of the mobile stations. Subsequent to allocating resource sub-blocks to the mobile stations, the base station may control the mobile stations to communicate with the base station using the allocated resource sub-blocks by, for example, sending a clear to send (CTS) to each mobile station. Each mobile station may decode a corresponding CTS to determine the time-frequency resource it is scheduled to access (e.g. the allocated resource sub-block).

Figure 4:
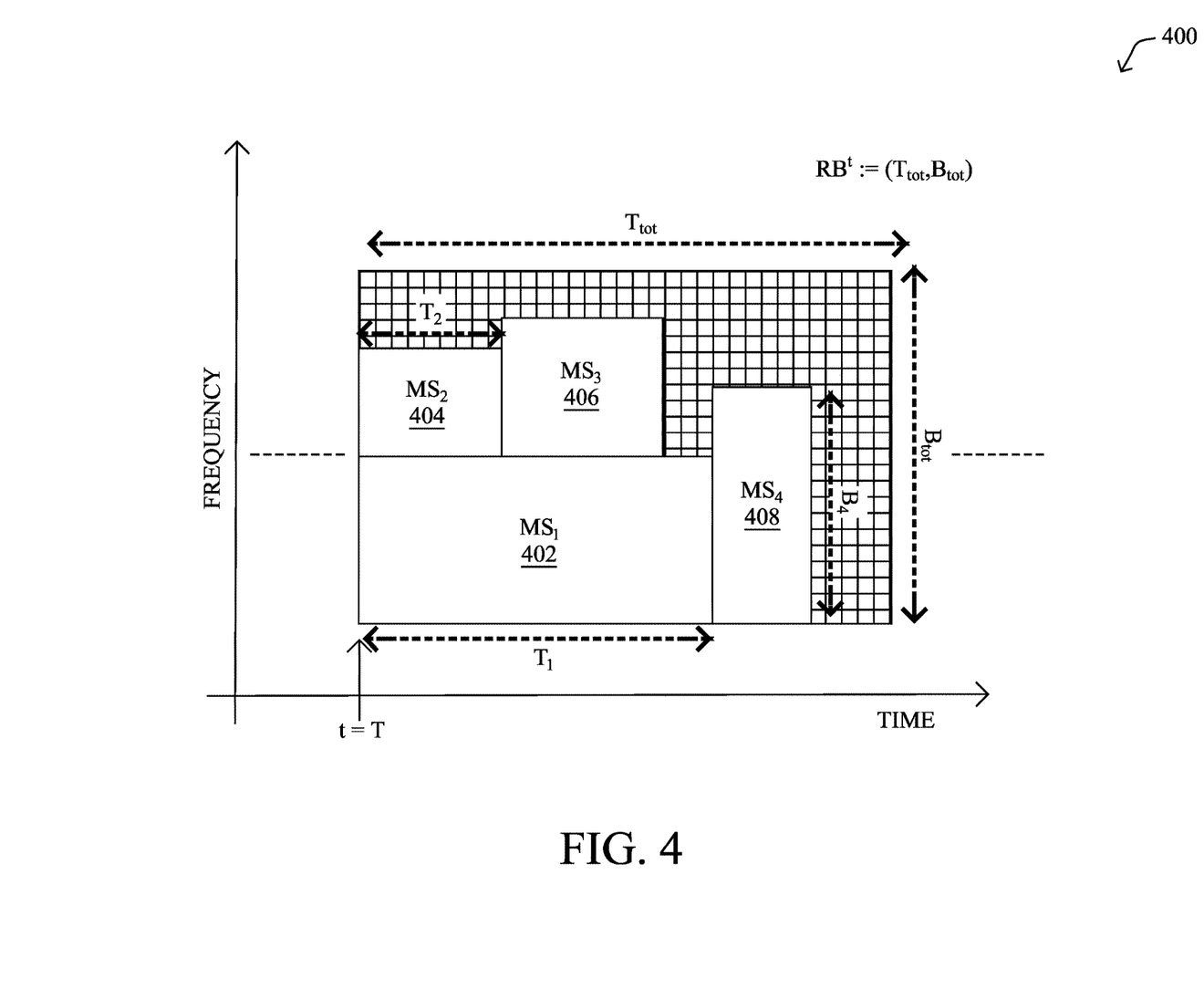
FIG. 4 illustrates example resource sub-blocks for a mmWave resource allocation scheme for V2I communications.

With reference to FIG. 4, example resource sub-blocks for a resource block allocation scheme are shown. In particular, a two-dimensional rectangular bin, $RB^t$, 400 along a time-frequency grid is shown. The two-dimensional rectangular bin 400 is made up of resource sub-blocks, $RSB^{tk}$. Notably, since both $RB^t$ and $RB^{tk}$ are made up of several minimum resource units (MRUs), the edges of all the rectangles can be deemed to take on only positive integer values. An MRU is the smallest discrete unit of time-frequency that the base station can allocate based on a property of a PHY (e.g., mmWave spectra) used for communication between the base station and the mobile station. A resource sub-block is made up of one or more MRUs and comprises a collection of subcarriers (e.g., tones as defined in IEEE 802.11ax) that is allocated, by a base station to a mobile station, for use for downlink and/or uplink transmissions between the base station and the mobile station. The property of the PHY may be, for example, orthogonal frequency-division multiplexing (OFDM) symbol time, sub-carrier spacing, pilot spacing (in time), or pilot spacing (in frequency).

When allocating resource sub-block(s) to a mobile station, the base station may use one or more packing parameters (or criteria/requirements). In particular, the allocated RSBs may be required need to satisfy one or more of the following:

the resource block allocation scheme does not span multiple bins (Since a mobile station is expected to request for a RSB with a start time, $T_i$, that is highly location dependent, all pending requests must expire after a total time, $T_{tot}$. The mobile station has to contend for access again in the next RB. As a result, the scheduling cannot span multiple RBs, thereby calling for a one-shot allocation of the RSBs);

resource sub-blocks are non-overlapping (as each beam of the base station services only one mobile station in an allocated resource sub-block);

resource sub-blocks of the resource block allocation scheme are fixed in orientation and do not rotate (since the mobile stations observe a channel that varies faster relative to the base station particularly due to required support for mobility);

resource sub-blocks of the resource block allocation scheme are allocated in an order the plurality of connection requests are received (e.g., resource sub-block allocations are not removed and/or repositioned since access to the PHY, for example, the mmWave channel, is expensive); and resource sub-blocks of the resource block allocation scheme are packed according to guillotine packing (for example, the base will preferentially allocate adjoining resource sub-blocks that are similar in dimensions to keep the spectrum switching overhead to a minimum).

To maximize the time-frequency resource utilization at the base station, the base station may attempt to minimize the amount of unallocated regions as shown in FIG. 4. Stated in another way, an objective of the base station is to minimize the unused areas/whitespaces in the two-dimensional rectangular bin 400. As shown, a first mobile station, a second mobile station, a third mobile station, and a fourth mobile station may be allocated (by the base station), respectively, a first resource sub-block 402, a second resource sub-block 404, a third resource sub-block 406, and a fourth resource sub-block 408. Minimizing the amount of unallocated regions may be understood as a classic combinatorial optimization problem (with an objective of minimizing unused time-frequency resources offered by the base station). It is to be noted that the problem of identifying the optimized packing discussed is different from solving a 0/1 2D knapsack problem (which will be understood by those skilled in the art). This is because the latter disregards the geometric constraints. In particular, the traditional problem aims to only identify which items, for example, rectangles to pack, and not the position/orientation of the rectangles.

Returning to FIG. 3A, after the mobile stations receive decode the corresponding CTSs to determine the time-frequency resource the mobile stations are scheduled to access (e.g. the allocated resource sub-block), the mobile stations, during the uplink phase 308, may transmit and or receive communications with the base station. After the uplink phase 308 completes, the base station may restart a beacon signaling phase (e.g., the beacon signaling phase 302 described in FIG. 3B).

Figure 5:
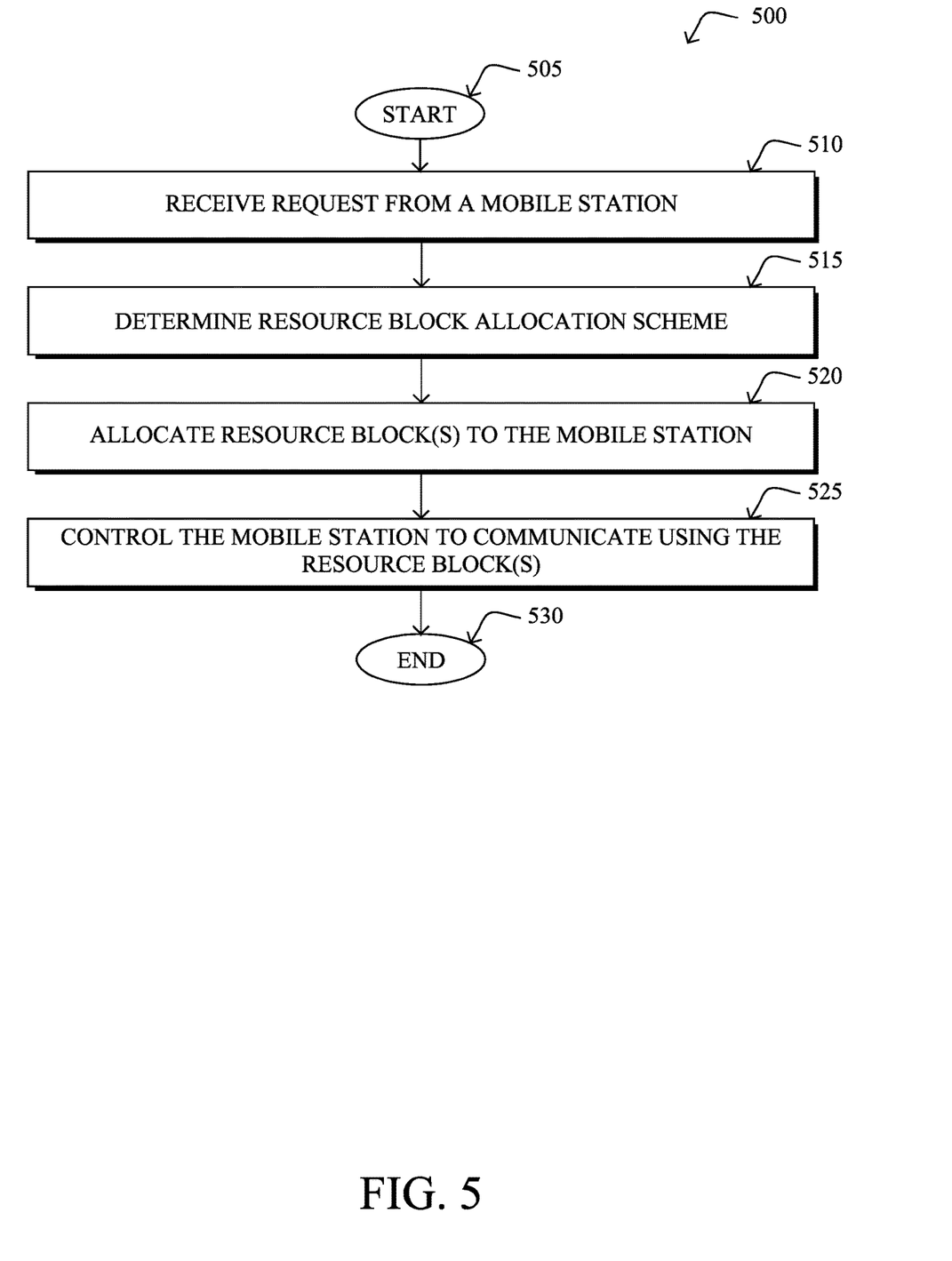
FIG. 5 illustrates an example simplified procedure for allocating mmWave resources for V2I communications.

FIG. 5 illustrates an example simplified procedure for a mmWave radio resource allocation scheme for V2I communications (e.g., between a base station and mobile stations), in accordance with one or more embodiments described herein. For example, a non-generic, specifically configured device (e.g., device 200, an apparatus, etc.) may perform procedure 500 by executing stored instructions (e.g., process 248). The procedure 500 may start at step 505, and continues to step 510, where, as described in greater detail above, a base station may receive a request from a mobile station. In particular, the base station may receive a connection request (e.g., an RTS) of a plurality of connection requests from a mobile station of a plurality of mobile stations. In various embodiments, the RTS may be sent by a mobile station subsequent to the base station performing a beacon signaling phase where the base station broadcasts a synchronization signal using an orientation beam pattern. The base station and the plurality of mobile stations may communicate using mmWave. In addition, the base station may be an RSU.

At step 515, as described in greater detail above, the base station may determine a resource block allocation scheme. In particular, the resource block allocation scheme may be formulated as a two-dimensional rectangular bin for the plurality of mobile stations. In various embodiments, each resource sub-block of the resource block allocation scheme represents a smallest discrete unit of time-frequency that the base station can allocate based on a property of a PHY used for communication between the base station and the mobile station. The property of the PHY may be selected from the group consistent of: OFDM symbol time, sub-carrier spacing, pilot spacing (in time), and pilot spacing (in frequency).

At step 520, the base station may allocate resource blocks to the mobile station. In particular, the base station may allocate one or more resource sub-blocks of the resource block allocation scheme to the mobile station using at least one packing parameter. In various embodiments, the at least one packing parameter may be selected from the group consisting of: a constraint that the resource block allocation scheme does not span multiple bins, a constraint that resource sub-blocks of the resource block allocation scheme are non-overlapping, a constraint that resource sub-blocks of the resource block allocation scheme are fixed in orientation and do not rotate, a constraint that resource sub-blocks of the resource block allocation scheme are allocated in an order the plurality of connection requests are received, and a constraint that resource sub-blocks of the resource block allocation scheme are packed according to guillotine packing.

At step 525, as detailed above, the base station may control the mobile station to communicate using the resource blocks. In particular, the base station may control the mobile station to communicate with the base station using the one or more resource sub-blocks. The base station may send a CTS, where the CTS can be received by a mobile station. The mobile station may decode the CTS to determine the time-frequency resource the mobile station is scheduled to access (e.g. the allocated resource sub-block).

Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

In one embodiment, the base station, as described with respect to procedure 500, may be further configured to broadcast a synchronization signal to the plurality of mobile stations using an orientation beam pattern. The base station may associate with the plurality of mobile stations. The base station may stop the broadcast of the synchronization signal subsequent to associating with the plurality of mobile stations. In the embodiment, the orientation beam pattern may be selected from the group consisting of: a random orientation of beam directions with a switching of beams in lock steps, a fixed orientation of beam directions with a random start time and a switching of beams in lock steps, and a fixed orientation of beam directions with a random switching of beams.

In one embodiment, the base station, as described with respect to procedure 500, may be further configured to receive a second connection request of the plurality of connection requests from a different mobile station. The base station may allocate other resource sub-blocks of the resource block allocation scheme to the different mobile station using the at least one packing parameter. The base station may control the different mobile station to communicate with the base station using the other resource sub-blocks.

In one embodiment, the base station, as described with respect to procedure 500, may be further configured to received uplink data from the mobile station using the one or more resource sub-blocks. The base station may restart a beacon signaling phase, the beacon signaling phase including receiving, by the base station, a new connection request from the mobile station.

The techniques described herein, therefore, provide for a mmWave radio resource allocation scheme for V2I communications of connected vehicles, such as automobiles, trains, planes, boats, or the like, or even certain non-vehicle devices. In some aspects, the resource block allocation scheme may be formulated as a rectangular bin packing problem. By formulating the resource block allocation scheme as a rectangular bin packing problem, the techniques herein allow efficient allocation of PHY resources to a plurality of mobile stations serviced by a base station. In particular, packing of a two-dimensional rectangular bin can be subjected to criteria (e.g., constraints) that, when followed, allow for efficient and maximized allocation of resources. In addition, the techniques herein allow for a base station to quickly identify and associate with mobile stations during a beacon signaling phase paired with a user association phase.

While there have been shown and described illustrative embodiments that provide for a mmWave radio resource allocation scheme for V2I communications, it is to be understood that various other adaptations and modifications may be made within the scope of the embodiments herein. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true scope of the embodiments herein.

What is claimed is:

1. A method, comprising:
   receiving, by a base station, a connection request of a plurality of connection requests from a mobile station of a plurality of mobile stations;
   determining, by the base station, a resource block allocation scheme that is formulated as a two dimensional rectangular bin for the plurality of mobile stations;
   allocating, by the base station, one or more resource sub-blocks of the resource block allocation scheme to the mobile station using at least one packing parameter, the at least one packing parameter comprising a constraint that resource sub-blocks of the resource block allocation scheme are packed according to guillotine packing; and
   controlling, by the base station, the mobile station to communicate with the base station using the one or more resource sub-blocks.

2. The method of claim 1, wherein each resource sub-block of the resource block allocation scheme represents a smallest discrete unit of time-frequency that the base station can allocate based on a property of a physical layer (PHY) used for communication between the base station and the mobile station.

3. The method of claim 2, wherein the property of the PHY is selected from the group consisting of: orthogonal frequency-division multiplexing (OFDM) symbol time, subcarrier spacing, pilot spacing (in time), and pilot spacing (in frequency).

4. The method of claim 1, wherein the at least one packing parameter further comprises another constraint that is selected from the group consisting of:
a constraint that the resource block allocation scheme does not span multiple bins,
a constraint that resource sub-blocks of the resource block allocation scheme are non-overlapping,
a constraint that resource sub-blocks of the resource block allocation scheme are fixed in orientation and do not rotate, and
a constraint that resource sub-blocks of the resource block allocation scheme are allocated in an order the plurality of connection requests are received.

5. The method of claim 1, further comprising:
broadcasting, by the base station, a synchronization signal to the plurality of mobile stations using an orientation beam pattern;
associating, by the base station, with the plurality of mobile stations; and
stopping, by the base station, the broadcast of the synchronization signal subsequent to associating with the plurality of mobile stations.

6. The method of claim 5, wherein orientation beam pattern is selected from the group consisting of:
a random orientation of beam directions with a switching of beams in lock steps,
a fixed orientation of beam directions with a random start time and a switching of beams in lock steps, and
a fixed orientation of beam directions with a random switching of beams.

7. The method of claim 1, further comprising:
receiving, by the base station, a second connection request of the plurality of connection requests from a different mobile station;
allocating, by the base station, other resource sub-blocks of the resource block allocation scheme to the different mobile station using the at least one packing parameter; and
controlling, by the base station, the different mobile station to communicate with the base station using the other resource sub-blocks.

8. The method of claim 1, further comprising:
receiving, by the base station, uplink data from the mobile station using the one or more resource sub-blocks; and
restarting, by the base station, a beacon signaling phase, the beacon signaling phase including receiving, by the base station, a new connection request from the mobile station.

9. The method of claim 1, wherein the base station and the plurality of mobile stations communicate using millimeter wave (mmWave).

10. The method of claim 1, wherein the base station is a road side unit (RSU).

11. The method of claim 1, wherein the mobile station is a vehicle.

12. An apparatus configured to operate as a base station, comprising
one or more network interfaces to communicate with a network;
a processor coupled to the network interfaces and configured to execute one or more processes; and
a memory configured to store a process executable by the processor, the process when executed operable to:
receive a connection request of a plurality of connection requests from a mobile station of a plurality of mobile stations;
determine a resource block allocation scheme that is formulated as a two dimensional rectangular bin for the plurality of mobile stations;
allocate one or more resource sub-blocks of the resource block allocation scheme to the mobile station using at least one packing parameter, the at least one packing parameter comprising a constraint that resource sub-blocks of the resource block allocation scheme are packed according to guillotine packing; and
control the mobile station to communicate with the base station using the one or more resource sub-blocks.

13. The apparatus of claim 12, wherein each resource sub-block of the resource block allocation scheme represents a smallest discrete unit of time-frequency that the base station can allocate based on a property of a physical layer (PHY) used for communication between the base station and the mobile station.

14. The apparatus of claim 13, wherein the property of the PHY is selected from the group consisting of: orthogonal frequency-division multiplexing (OFDM) symbol time, subcarrier spacing, pilot spacing (in time), and pilot spacing (in frequency).

15. The apparatus of claim 12, wherein the at least one packing parameter further comprises another constraint that is selected from the group consisting of:
a constraint that the resource block allocation scheme does not span multiple bins,
a constraint that resource sub-blocks of the resource block allocation scheme are non-overlapping,
a constraint that resource sub-blocks of the resource block allocation scheme are fixed in orientation and do not rotate, and
a constraint that resource sub-blocks of the resource block allocation scheme are allocated in an order the plurality of connection requests are received.

16. The apparatus of claim 12, where the process when executed is further operable to:
broadcast a synchronization signal to the plurality of mobile stations using an orientation beam pattern;
associate with the plurality of mobile stations; and
stop the broadcast of the synchronization signal subsequent to the association with the plurality of mobile stations.

17. The apparatus of claim 16, wherein orientation beam pattern is selected from the group consisting of:
a random orientation of beam directions with a switching of beams in lock steps,
a fixed orientation of beam directions with a random start time and a switching of beams in lock steps, and
a fixed orientation of beam directions with a random switching of beams.

18. The apparatus of claim 12, where the process when executed is further operable to:
receive a second connection request of the plurality of connection requests from a different mobile station;
allocate other resource sub-blocks of the resource block allocation scheme to the different mobile station using the at least one packing parameter; and
control the different mobile station to communicate with the base station using the other resource sub-blocks.

19. The apparatus of claim 12, where the process when executed is further operable to:
- receive uplink data from the mobile station using the one or more resource sub-blocks; and
- restart a beacon signaling phase, the beacon signaling phase including receiving a new connection request from the mobile station.

20. A tangible, non-transitory, computer-readable medium storing program instructions that cause a device in a network, the device operating as a base station, to execute a process comprising:
- receiving a connection request of a plurality of connection requests from a mobile station of a plurality of mobile stations;
- determining a resource block allocation scheme that is formulated as a two dimensional rectangular bin for the plurality of mobile stations;
- allocating one or more resource sub-blocks of the resource block allocation scheme to the mobile station using at least one packing parameter, the at least one packing parameter comprising a constraint that resource sub-blocks of the resource block allocation scheme are packed according to guillotine packing; and
- controlling the mobile station to communicate with the base station using the one or more resource sub-blocks.

* * * * *